(12) United States Patent
Tzeng

(10) Patent No.: US 6,438,135 B1
(45) Date of Patent: Aug. 20, 2002

(54) DYNAMIC WEIGHTED ROUND ROBIN QUEUING

(75) Inventor: Shrjie Tzeng, Fremont, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/422,591

(22) Filed: Oct. 21, 1999

(51) Int. Cl.[7] .............................................. H04L 12/28
(52) U.S. Cl. ....................................................... 370/412
(58) Field of Search ................................. 370/412, 455, 370/230–232, 392–104, 422–430, 911, 389, 13, 360; 710/40–44, 72, 310; 455/525; 709/249, 224

(56) References Cited

U.S. PATENT DOCUMENTS

| | | | | |
|---|---|---|---|---|
| 5,487,061 A | * | 1/1996 | Bray | 370/13 |
| 5,870,629 A | * | 2/1999 | Borden et al. | 370/412 |
| 5,917,822 A | | 6/1999 | Lyles et al. | |
| 5,926,459 A | | 7/1999 | Lyles et al. | |
| 6,157,654 A | * | 12/2000 | Davis | 370/412 |
| 6,198,723 B1 | * | 3/2001 | Parruck et al. | 370/230 |
| 6,260,073 B1 | * | 7/2001 | Walker et al. | 370/412 |
| 6,317,416 B1 | * | 11/2001 | Giroux et al. | 370/232 |
| 6,385,168 B1 | * | 5/2002 | Davis et al. | 370/230 |

* cited by examiner

*Primary Examiner*—Kwang Bin Yao
*Assistant Examiner*—Prenell Jones
(74) *Attorney, Agent, or Firm*—Renner, Otto, Boisselle & Sklar, LLP

(57) ABSTRACT

A method for transmitting a plurality of data packets through a network. Each data packet is assigned to one of a plurality of priority queues and each priority queue has a service weight. A priority weight is assigned to each of the data packets and each priority weight has a value. Data packets are delivered from one of the priority queues until a service satisfied condition is met. The service satisfied condition is met when a combination of the values of the priority weights for each of the delivered data packets is equal to or is greater than the service weight assigned to the priority queue. A queuing switch for implementing this method is also discussed. The queuing switch includes an incoming data packet processor and a plurality of priority queues.

15 Claims, 4 Drawing Sheets

DYNAMIC WEIGHTED ROUND ROBIN QUEUING

TECHNICAL FIELD

The present invention generally relates to network communications and, more particularly, to a method for the prioritized delivery of data packets from a queuing switch.

BACKGROUND ART

There is an ever present demand for the efficient delivery of data packets over computer networks and communication networks to establish a variety of quality of service (QOS) objectives. One QOS objective is to deliver high priority data packets either before or more efficiently than normal and low priority data packets. To achieve this goal, packet traffic shaping techniques and prioritization schemes have been developed.

Transport layer switches, or layer 4 switches, are typically used to implement most prioritization schemes. One common prioritization scheme is round robin (RR) queuing. In round robin queuing, a set of queues, or buffers, are established for temporarily holding data packets while the data packets await delivery. As an example, four queues may be established, including a high priority queue, a normal/high priority queue, a normal/low priority queue and a low priority queue. Each data packet is assigned to one of the queues based on a predetermined algorithm. The switch delivers messages from the queues based on a round robin approach. The round robin approach entails delivering a predetermined number of data packets from one of the queues, then delivering the same number of data packets from each of the other queues in descending order of priority before returning to the initial queue and repeating the process. Since the same number of packets are sent from each queue, the service ratio between queues is 1:1. This means that the high priority queue may not be serviced enough to deliver all the high priority packets while meeting QOS expectations.

Another common prioritization scheme is weighted round robin (WRR) queuing. Weighted round robin queuing uses the same basic structure as round robin queuing, but services the higher priority queues more frequently than the lower priority queues. A common implementation of WRR is to send a greater number of data packets from the higher priority queues than are sent from the lower priority queues for each round through the priority queues. It is common to have a service ratio between the high priority queue and the low priority queue of the foregoing round robin example to be set to 4:1, meaning that four packets are sent from the high priority queue for each packet sent from the low priority queue. However, in most actual data network environments, high priority data packets may constitute only about 20% of all data packets. The remaining 80% of the data packets have lower priorities. The result is that high priority data packets in this example are serviced with a priority which is effectively 16 times the priority of low priority packets. As a result, the lower priority queues are not serviced enough and the lower priority data packets may experience significant delay before being delivered. This means that QOS expectations for the lower priority data packets are not met.

Round robin and weighted round robin queuing schemes are usually implemented using hardware having a fixed procedure for delivering packets. Therefore, round robin and weighted round robin techniques are not able to adapt to any one particular network to optimize the packet delivery efficiency of the network.

SUMMARY OF THE INVENTION

The present invention provides a method for transmitting a plurality of data packets through a network. Each data packet is assigned to one of a plurality of priority queues and each priority queue has a service weight. A priority weight is assigned to each of the data packets and each priority weight has a value. Data packets are delivered from one of the priority queues until a service satisfied condition is met. The service satisfied condition is met when a combination of the values of the priority weights for each of the delivered data packets is equal to or is greater than the service weight assigned to the priority queue.

In accordance with another aspect of the invention, a queuing switch is provided. The queuing switch includes an incoming data packet processor which derives a queue assignment and a priority weight for each of a plurality of incoming data packets. Each priority weight has a value. The queuing switch also includes a plurality of priority queues and each priority queue has a service weight. The incoming data packet processor directs each data packet to one of the priority queues based on the queue assignment for each data packet. Data packets are delivered from a first one of the priority queues until a service satisfied condition is met. The service satisfied condition is met when a combination of the values of the priority weights for each of the delivered data packets is equal to or is greater than the service weight assigned to the first priority queue.

DISCLOSURE OF INVENTION

Figure 1:
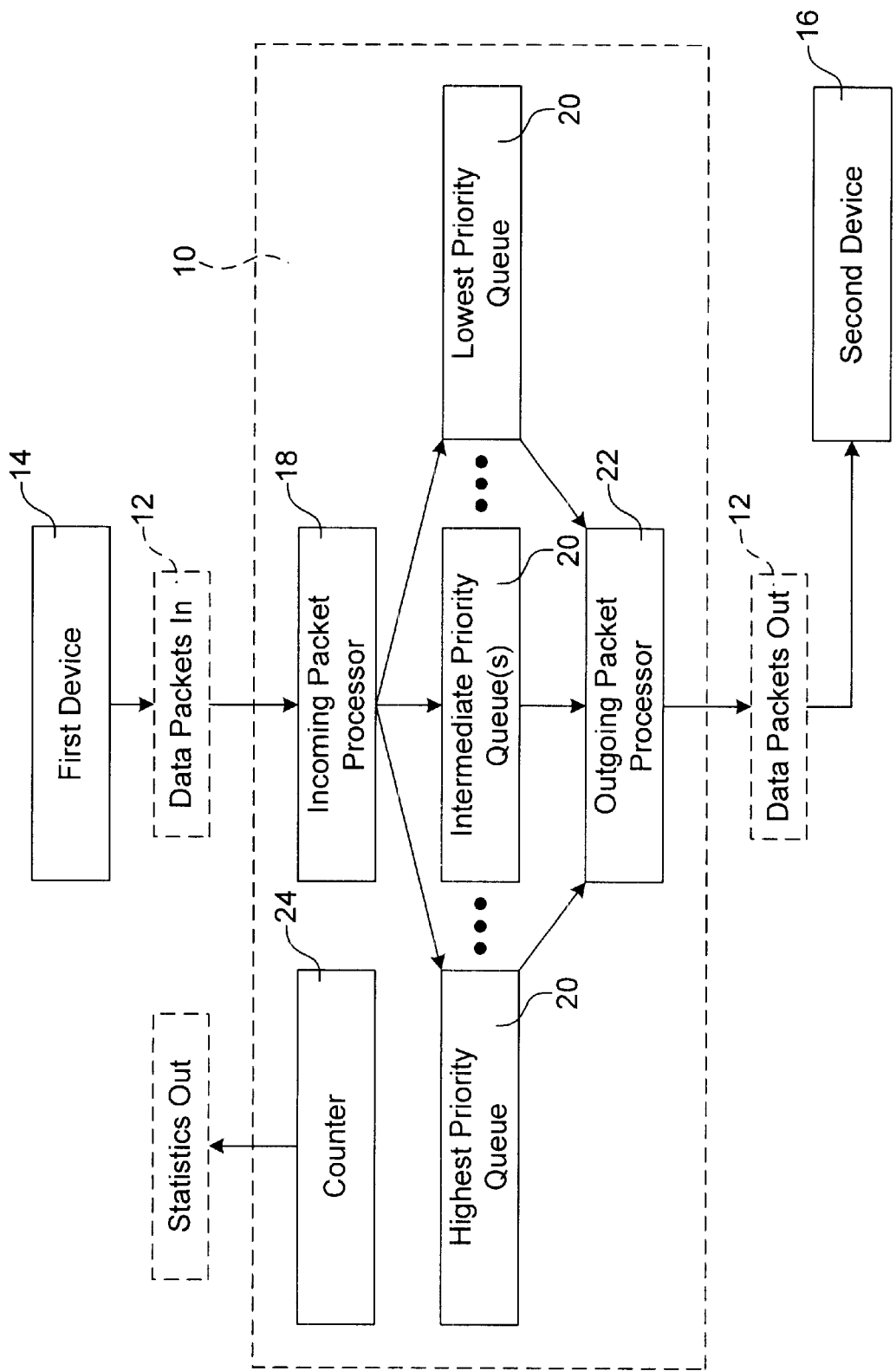
FIG. 1 is a block diagram of a queuing switch according to the present invention.

Referring to FIG. 1, a block diagram of a queuing switch 10 having a switch fabric for implementing a dynamic weighted round robin (DWRR) queuing method is illustrated. The method and queuing switch 10 are directed to prioritizing data packets 12 for delivery and may be adapted for use in data, computer, telecommunication or multimedia networks, or in any other type of network where packets of data requiring prioritization are transmitted from a transmitting, or a first device 14, to a receiving, or a second device 16. As used herein, the term data packet 12 is intended to mean any packet, frame, message, or the like, that is transmitted through the network. The prioritization scheme discussed herein is adaptable to networks such as asynchronous transfer mode (ATM) networks and Ethernets. The queuing switch 10 is preferably part of a programmable hardware switch used to carry out data packet 12 transmission. For example, the switch 10 could be used to implement the network layer of an open systems interconnect (OSI) protocol stack, or layer 3 switch such as a router, or a switch used to implement the OSI transport layer, or layer 4 switch. However, one skilled in the art will appreciate that the queuing switch 10 and method according to the invention can be implemented with other hardware devices or with software alone.

The queuing switch 10 is provided with an incoming packet processor 18, a series of priority queues 20 and an outgoing packet processor 22. Generally, the incoming packet processor 18 receives data packets 12 that are sent from the first device 14 to the second device 16. The priority queues 20 range in priority from highest to lowest and are implemented with conventional software or hardware data packet buffers for temporarily storing data packets as they await delivery. The outgoing packet processor 22 sends data packets 12 from the priority queues 20 to the second device 16. As one skilled in the art will appreciate, the queuing switch 10 may be a part of the first device 14 or located in a separate message transmitting device. Other higher or lower order data packet switching devices, such as routers or bridges, may used as needed. The queuing switch 10 is preferably also provided with a counter 24 for collecting statistical information regarding data packet 12 throughput and priority queue 20 usage, for one or more of the priority queues 20.

Figure 2:
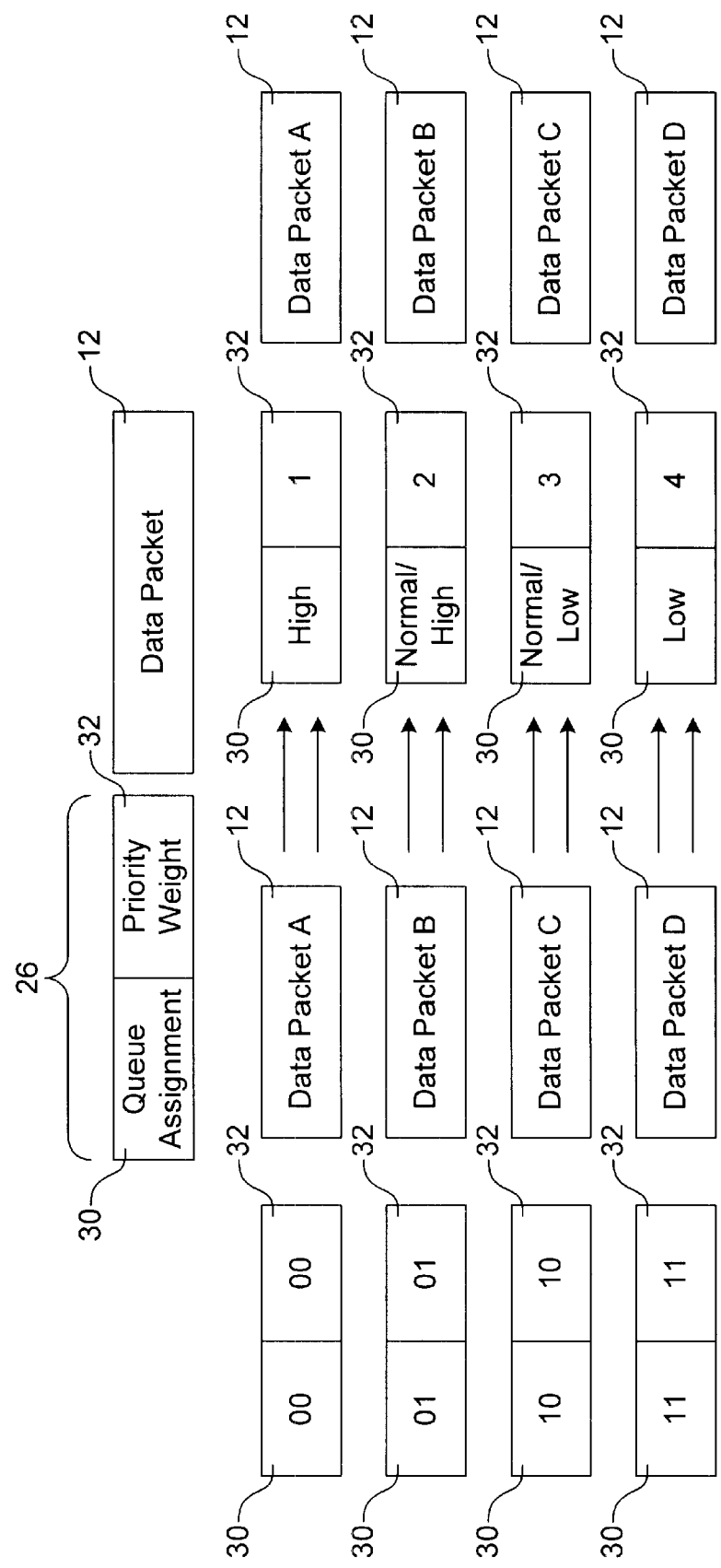
FIG. 2 is a schematic representation of a data packet and associated equation identifier according to the present invention.

With additional reference to FIG. 2, the incoming packet processor 18 creates an equation identifier (EID) 26 for each incoming data packet 12. The EID does not become a part of the data packet, but is logically associated with the data packet. Alternatively, the EID can be appended to the data packet as a header which is later stripped before transmission by the outgoing packet processor 22. The EID for each data packet is derived from a combination of factors related to the data packet (step 28 in FIG. 3). Example factors include the hardware device generating the data packet, the identity of the person using the hardware device generating the data packet, choices made by the person using the hardware device generating the data packet, the general type of information contained in the data packet, the specific content of the data packet, the destination device of the data packet, and/or the destination person of the data packet. In an example embodiment, the EID is a six bit binary word which represents the end step solution, or equation result, to an EID derivation algorithm. The EID derivation algorithm accounts for the selected combination of factors. In this example, the six bit EID has sixty four possible values. In addition to one of these values, additional prioritization data can be associated with each data packet. For example, the network can use IEEE Std. 802.1Q for prioritization of Ethernet traffic where a three bit field allows each user to set up to eight user priorities for time-critical information.

The EID 26 serves two functions. The functions are assigning each data packet to a priority queue 20, or queue assignment 30, and assigning a priority weight 32 to each packet. Accordingly, the EID is preferably a binary word of a predetermined number of bits. The EID is preferably two to eight bits long, but could be longer if needed. The upper bits of the EID, or a first segment of the EID, represents the priority queue assignment 30 and the lower bits of the EID, or a second segment of the EID, represents the priority weight 32. The priority weight is preferably an integer number. FIG. 2 illustrates a generic EID associated with a data packet and, as an example, FIG. 2 also illustrates a set of four data packets 12 each having a four bit EID, where the first two bits represent the queue assignment 30 for the associated data packet 12 and the last two bits represent the priority weight 32 for the associated data packet 12.

Figure 3:
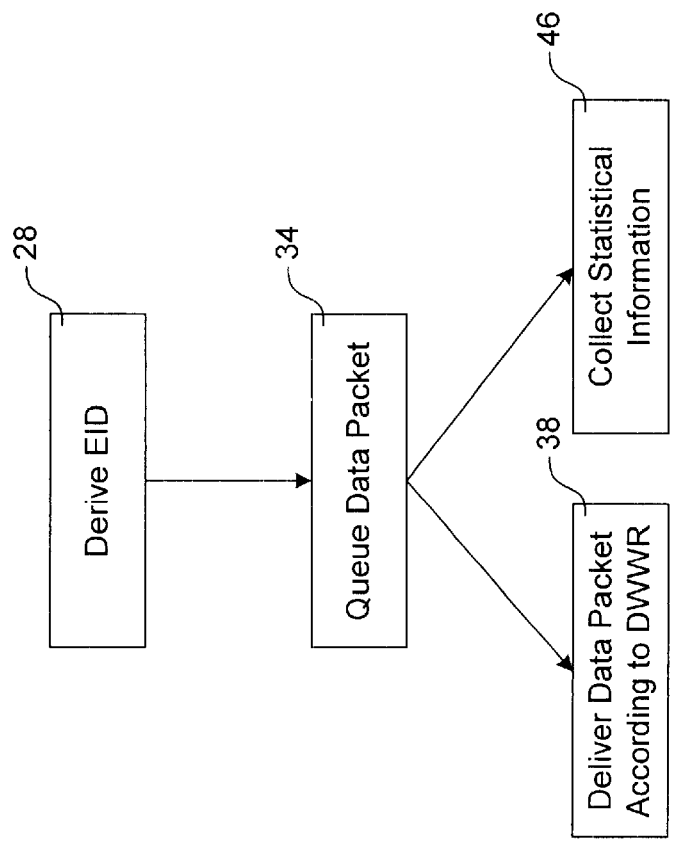
FIG. 3 is a data packet flow chart according to the present invention.

With additional reference to FIG. 3, once the incoming packet processor has associated each incoming data packet with an EID, the data packet is sent to the priority queue matching the priority queue assignment (step 34). It is noted that the EID for each data packet may alternatively be generated before the data packet reaches the queuing switch 10. In that event, the incoming packet processor 18 will not be responsible for generating the EID, but will only be responsible for reading the priority queue assignment and sending the data packet to the priority queue 20 matching the priority queue assignment. Once each data packet reaches its proper priority queue 20, it is buffered along with other data packets assigned to the same priority queue 20.

Figure 4:
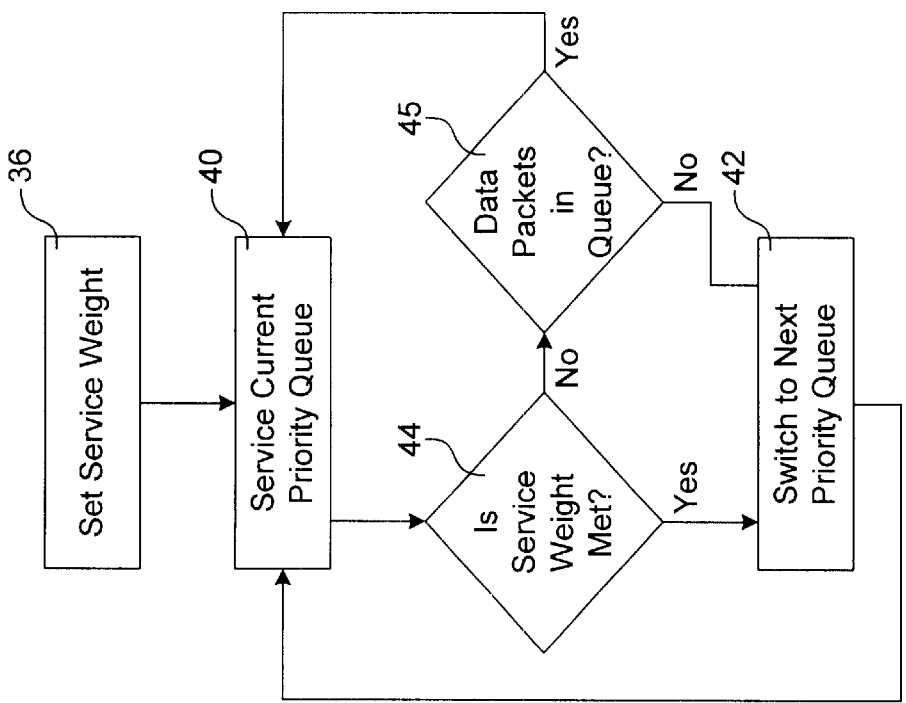
FIG. 4 is a dynamic weighted round robin flow chart according to the present invention.

With additional reference to FIG. 4, each priority queue 20 is assigned a service weight (step 36). The service weight is preferably an integer number greater than zero. The value of the service weight for each priority queue 20 is predetermined by either a default setting or by a network administrator. As will be more fully described below, the service weight can be changed by the network administrator with the assistance of the statistical information collected by the counter 24. The service weight for each priority queue 20 indirectly represents how many data packets should be sent from each priority queue 20 before the switch fabric of the queuing switch 20 begins sending data packets from the next priority queue 20. The service weight is preferably not a one for one count of how many data packets are sent from each priority queue 20 when the switch fabric services the currently serviced priority queue 20. Rather, the service weight is satisfied when the sum of the priority weights 32 for each data packet 12 sent from the priority queue 20 being serviced is equal to or is greater than (i.e., meets or exceeds) the assigned integer number value of the service weight. As described herein, the priority weights 32 and the service weights 30 are numerical integers. However, one skilled in the art will appreciate that the values for the priority weights and the service weights can be any type of symbolic representation. As will be discussed in more detail below, the switch fabric will change which priority queue is being serviced when either the service weight is satisfied for the currently serviced queue or when there are no packets in the currently serviced queue.

Generally, the switch fabric will service (i.e., deliver data packets 12, step 38) the priority queues 20 one after another (steps 40 and 42) and then return to the first serviced queue to repeat the process in dynamic weighted round robin queuing fashion to cyclically deliver data packets from each of the priority queues 20. Preferably, the highest priority queue is serviced first, followed by the other priority queues 20 in descending order of priority. After the lowest priority queue is serviced, the queuing switch will again service the highest priority queue.

The queuing switch 10 will change the priority queue 20 being serviced when either of two service satisfied conditions is met. The first service satisfied condition is met when the service weight of the priority queue 20 being serviced is satisfied (step 44). This means that the number of data packets 12 sent from each priority queue 20 during one round of the dynamic weight round robin queuing method is dependent on the priority weight of the data packets 12 and the service weight of the priority queue 20. Therefore, on average, more data packets can be sent from a particular priority queue before the service weight is satisfied and the next queue is serviced if the average value of the priority weights sent through that priority queue is low. If the first service satisfied condition is met the switch will service the next priority queue to be serviced, step 42. If the service weight is not satisfied in step 44, the switch 10 will check whether the second service satisfied condition is met (step 45). The second service satisfied condition is met when there are no data packets 12 awaiting delivery in the priority queue 20 being serviced. If there are no data packets waiting to be delivery in the queue being serviced, the switch 10 will service the next priority queue to be serviced, step 42. If there are data packets waiting to be delivered in the queue being serviced, the switch will deliver the next data packet (step 40).

Each priority queue 20 preferably transmits data packets 12 based on a first-in-first-out (FIFO) basis. However, other queuing methods can be employed depending on network requirements. Example alternative queuing methods include last-in-first-out (LIFO) and highest-priority-first-out. If a highest-priority-first-out method is used, the data packets with the lowest priority weight value will be transmitted before data packets with a higher priority weight value.

The outgoing data packet processor 22 manages the delivery of data packets 12 from each of the priority queues 20 to the second device 16 or any intermediate transmission devices. The outgoing data packet processor 22 is tasked with keeping track of the sum of the priority weights for the data packets 12 delivered by the priority queue 20 being serviced and switching between priority queues 20, if either of the foregoing service satisfied conditions are met. Alternatively, the outgoing data packet processor 22 can be eliminated and either a queuing switch 10 controller or each individual priority queue 20 can be responsible for the tasks of the outgoing data packet processor 22.

As indicated above, conventional RR and WRR switches deliver data packets based on a fixed algorithm which is programmed into the hardware and cannot be changed by a person or through software modifications. The present invention provides a switch 10 having changeable parameters. More specifically, the service weights for each priority queue 20 and the EID for each data packet 12 is changeable to enhance performance of the queuing switch 10. These variables can be set depending on the nature of the network and can be adjusted in response to future changes in the network traffic pattern. The counter 24 collects statistical information to assist the network administrator in deciding what changes to make (step 46 in FIG. 3). These decisions include whether to raise, lower or keep the service weight for each priority queue 20 the same, whether to change which priority queue 20 certain data packets 12 are sent to, and whether to change the priority weight for certain data packets 12. Accordingly, the counter 24 tracks information such as how many data packets 12 of each priority weight are sent through each of the priority queues 20 and how long the data packets 12 wait in the priority queues 20 before being delivered. This information, as recorded by the counter 24, can be polled by a host computer programmed with network management software and a GUI interface. The host computer presents the collected information in an organized format to the user, with or without programmed suggestions directed to enhancing performance of the queuing switch 10 or suggestions directed to establishing full utilization of all of the queuing switch 10 priority queues 20. The network administrator then can provide commands or information to the switch 10 to change or reconfigure the service weights of the priority queues 20 or the priority weights 32 of the data packets 12.

EXAMPLE

Figure 5:
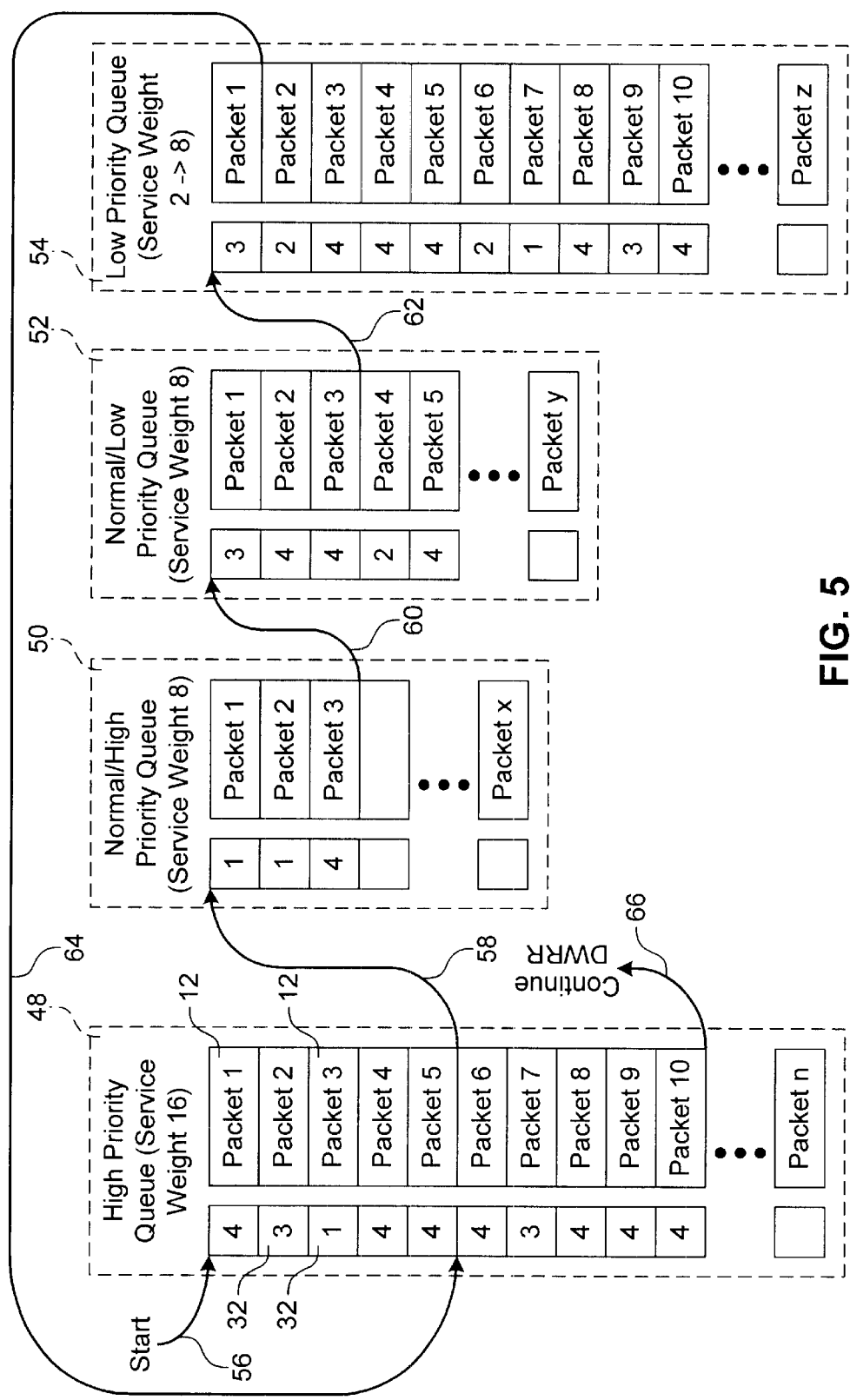
FIG. 5 is a schematic representation of an example queue structure controlled by a dynamic weighted round robin queuing method according to the present invention.

In order to further describe the dynamic weighted round robin method of the present invention, the following example is provided. Referring now to FIG. 5, an example queuing switch 10 is provided with four priority queues 20, including a high priority queue 48, a normal/high priority queue 50, a normal/low priority queue 52 and a low priority queue 54. The high priority queue 48 is assigned a service weight of 16 and can store up to n number of packets, the normal/high priority queue 50 is assigned a service weight of 8 and can store up to x number of packets, the normal/low priority queue 52 is assigned a service weight of 8 and can store up to y number of packets and the low priority queue 54 is assigned a service weight of two and can store up to z number of packets. In this example, each data packet 12 can have a priority weight of 1, 2, 3 or 4. For illustrative purposes, FIG. 5 shows each priority queue populated with a series of data packets 12. The high priority queue 48 contains packets 1 through 10, the normal/high priority queue 50 contains packets 1 through 3, the normal/low priority queue 52 contains packets 1 through 5, and a low priority queue 54 contains packets 1 through 10. The priority weight portion of the EID for each of these data packets is shown next to the data packet in FIG. 5. For simplicity, the queue assignment portion of the EID for each data packet is omitted in FIG. 5.

The switch fabric will start sending data packets from the high priority queue 48 (arrow 56). Data packets 1, 2, 3 and so forth will be sent until the sum of the values of the priority weight for each data packet sent is equal to or is greater than the service weight, thereby satisfying the first service satisfied condition. In the example, the first five packets will be sent since the sum of the values of the priority weights for the first five data packets totals 16. Then the switching queue 10 will start sending packets from the normal/high priority queue 50 (arrow 58). In the example, only three data packets are in the normal/high priority queue 50 and the sum of the packets' priority weights does not exceed the service weight. However, after the three packets are sent the normal/high priority queue 50 will have no data packet entries and the second service satisfied condition will be met for the normal/high priority queue 50. Therefore, the three data packets will be sent and the queuing switch 10 will start sending packets from the normal/low priority queue 52 (arrow 60) until either the first service satisfied or the second service satisfied condition is met for the normal/low priority queue 52. In the example, the first two data packets in the normal/low priority queue 52 have priority weight values totaling seven, which does not meet or exceed the queue's service weight. The third data packet has a priority weight value of four. The sum of the priority weight values of the first three data packets exceeds the queue's service weight, thereby satisfying one of the service satisfied conditions for the normal/low priority queue 52.

The switching fabric will then start to send data packets from the low priority queue 54 under the same operating procedure (arrow 62). Since the priority weight of the first data packet in the low priority queue 54 exceeds the service weight of that queue, the first service satisfied conditions is met for the low priority queue 54 and the switch fabric will return to servicing the high priority queue 48 (arrow 64). The foregoing dynamic weighted round robin procedure is the repeated (arrow 66). However, as illustrated, the low priority queue 54 will develop a backlog of data packets to send under such a low service weight. As the dynamic weighted round robin process continues, the counter 24 will collect information regarding the number of data packets 12 processed and how long the data packets 12 stayed in the priority queues 20 while awaiting delivery. The user administrating the network can use this information to change the EID for selected types of data packets and adjust the service weight of the priority queues 20, thereby enhancing the performance and queue utilization of the queuing switch 10.

The switch 10 can also be programmed to alert the administrator if data packets are not being delivered within a specified time. In addition, if the administrator is aware of a condition which may change network usage, such as the addition of a new network user or other network pattern change, then appropriate changes to the EIDs and service weights can also be made. With this in mind, if the backlog of data packets in the low priority queue 54 persists, the administrator can take counteractive actions. For example, the administrator can raise the service weight of the low priority queue 54 to a higher value, such as 8. The administrator can also lower the priority weight of selected types of data packets being delivered through the low priority queue 54 and change the queue through which selected types of data packets are sent by modifying the queue assignment.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of transmitting a plurality of data packets through a network, comprising the steps of:
    assigning each data packet to one of a plurality of priority queues, each priority queue having a numerical service weight;
    assigning a priority weight to each of the data packets, each priority weight having a numerical value; and
    servicing each of the priority queues in round robin order by delivering data packets from one of the priority queues and transitioning to deliver data packets from a subsequent priority queue in the round robin order when a service satisfied condition is met for the priority queue being serviced, the service satisfied condition being met when a combination of the numerical values of the priority weights for each of the data packets delivered from the priority queue being serviced is equal to or is greater than the numerical service weight assigned to the priority queue being serviced.

2. The method of transmitting data packets according to claim 1, further comprising the step of collecting statistical information regarding data packet throughput and priority queue usage.

3. The method of transmitting data packets according to claim 1, wherein the service satisfied condition is met if no data packets are currently assigned to the one of the priority queues.

4. The method of transmitting data packets according to claim 1, further comprising the step of changing the priority queue assignment of an incoming data packet.

5. The method of transmitting data packets according to claim 1, further comprising the step of changing the priority weight of an incoming data packet.

6. The method of transmitting data packets according to claim 1, further comprising the step of changing the service weight of one of the priority queues.

7. The method of transmitting data packets according to claim 1, wherein data packets are delivered from each queue on a first-in-first-out basis.

8. A queuing switch, comprising:
    an incoming data packet processor, the incoming data packet processor deriving a queue assignment for each of a plurality of incoming data packets and assigning a numerical priority weight to each data packet;
    a plurality of priority queues, each priority queue having a numerical service weight, wherein the incoming data packet processor directs each data packet to one of the priority queues based on the queue assignment for each data packet; and
    an outgoing data packet processor, the outgoing data packet processor servicing each priority queue in round robin order by delivering data packets from each of the priority queues towards a receiving device, the outgoing data packet processor transitioning from one priority queue to a subsequent priority queue in the round robin order when a service satisfied condition is met for the priority queue being serviced, the service satisfied condition being met when a combination of the numerical values of the priority weights for each of the data packets delivered from the priority queue being serviced is equal to or is greater than the numerical service weight assigned to the priority queue being serviced.

9. The queuing switch according to claim 8, wherein the outgoing data packet processor combines the priority weights of each of the sent data packets.

10. The queuing switch according to claim 8, further comprising a counter, the counter collecting statistical information regarding data packet throughput and priority queue usage.

11. The queuing switch according to claim 8, wherein the service satisfied condition is met if no data packets are currently assigned to the priority queue being serviced.

12. The queuing switch according to claim 8, wherein the priority queue assignment of an incoming data packet is changeable.

13. The queuing switch according to claim 8, wherein the priority weight of an incoming data packet is changeable.

14. The queuing switch according to claim 8, wherein the service weight of each of the priority queues is changeable.

15. The queuing switch according to claim 8, wherein data packets are delivered from each queue on a first-in-first-out basis.

* * * * *